US005301389A

United States Patent [19]

Engel et al.

[11] Patent Number: 5,301,389

[45] Date of Patent: Apr. 12, 1994

[54] JACK HANDLE WITH MEANS FOR LIMITING THE TORQUE WHICH CAN BE APPLIED TO A JACK

[75] Inventors: Darryl L. Engel, LaOtto; John R. Scoville, Butler, both of Ind.

[73] Assignee: Universal Tool & Stamping Company, Inc., Butler, Ind.

[21] Appl. No.: 51,697

[22] Filed: Apr. 26, 1993

[51] Int. Cl.[5] .................. A47B 95/02; G05G 5/06; G05G 1/00; B62D 1/06

[52] U.S. Cl. .................. 16/114 R; 74/528; 74/557; 74/545; 254/DIG. 3

[58] Field of Search .................. 16/114 R; 74/528, 557, 74/545; 254/DIG. 3

[56] References Cited

U.S. PATENT DOCUMENTS 3,602,065 8/1971 Ratcliff .
3,707,885 1/1973 Profet .
3,921,471 11/1975 Smith .
4,550,581 11/1985 Best et al. .................. 70/422
5,064,171 11/1991 Engel .................. 254/DIG. 3

*Primary Examiner*—Lowell A. Larson
*Assistant Examiner*—Carmine Cuda
*Attorney, Agent, or Firm*—Hill, Steadman & Simpson

[57] ABSTRACT

A jack handle which limits the torque that can be applied to a jack so as to prevent overload and injury. The jack handle has a reduced cross-sectional portion between the handle and the jack engaging portion so that the handle will break off at the reduced cross-sectional portion, thus, preventing overloading of the jack. A portion of the handle which does not break off is provided with a jack engaging portion so that the broken portion of the jack can be removed and the second jack engaging portion can be inserted into the jack to lower it.

5 Claims, 1 Drawing Sheet

JACK HANDLE WITH MEANS FOR LIMITING THE TORQUE WHICH CAN BE APPLIED TO A JACK

BACKGROUND OF THE INVENTION

1. Field of the Invention

This invention relates in general to an improved jack handle which prevents overloading of the jack. Generally, truck and van jacks require extension handles for operating the jack.

2. Description of Related Art

It is dangerous if such jacks are overloaded and it is desirable to provide means for limiting the operating input torque so that if the jack is misused, such as overloaded the jack will not be destroyed. Bottle-type jacks such as used on many trucks and vans typically will not stand more than about 50 foot pounds of torque. A drive mechanism of the jack brakes above that level of torque. When this occurs, the jack is left under the vehicle with no way to lower the jack and remove it and this presents the user with the dangerous problem of how to remove the jack. See also U.S. Pat. Nos. 3,602,065, 3,921,471 and 3,707,885.

SUMMARY OF THE INVENTION

The present invention comprises a jack handle with a reduced cross-section such that if a limiting torque is exceeded the handle will be break at the reduced cross-sectional portion thus preventing the application of excessive torque to the jack. The handle breaks on overload at an undercut or twist-off point behind the drive nose and the undercut has a size so as to provide the required torque limit for the jack. Adjacent to the undercut or elsewhere on the remaining portion of the handle is an additional jack engaging flat that can be used to drive the jack after the failure mode has occurred. Thus, the present invention indicates to the user that the jack is being overloaded when the extension handle twists or breaks off at the reduced cross-sectional location. The consumer can then use the remaining portion of the handle to insert it into the jack and lower the jack.

The invention could be used on either end of the extension handle and a twist-off point followed by another drive area is all that is required for the invention.

It is an object of the invention to provide a twist-off jack handle for limiting the applied torque to a jack and which has a second jack engaging portion which can be used to lower the jack after twist-off has occurred.

It is a feature of the present invention to provide an improved jack handle that prevents a jack from being overloaded and allows the jack to be safely lowered after twist-off has occurred.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure, and in which:

DETAILED DESCRIPTION OF THE PREFERRED EMBODIMENTS

Figure 1:
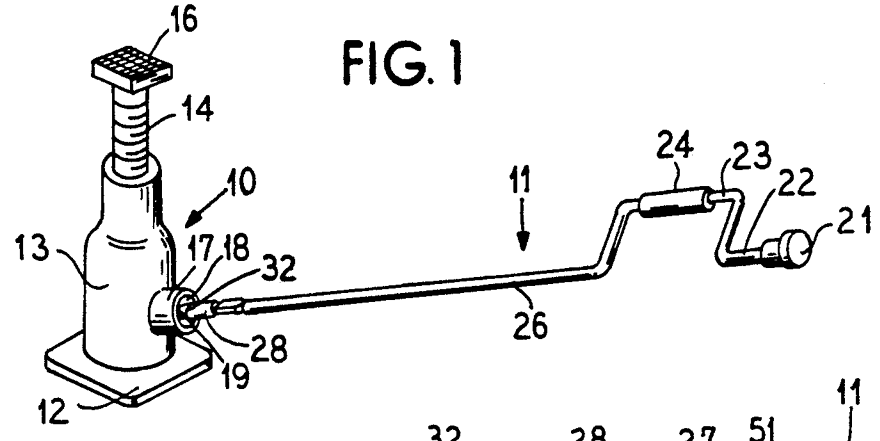
FIG. 1 is a perspective view of a jack and the novel jack handle of the invention.
Figure 2:
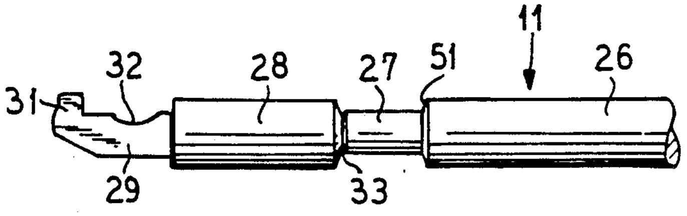
FIG. 2 is a side plan view of the end of the novel jack handle.
Figure 3:
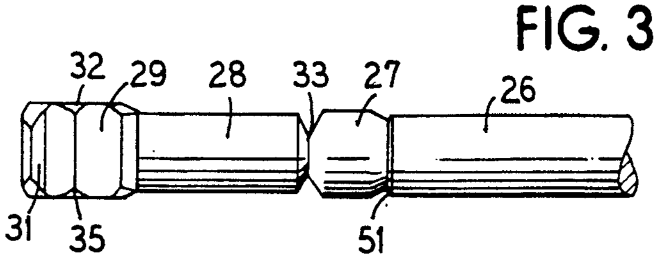
FIG. 3 is a top plan view of the end of the novel jack handle.
Figure 4:
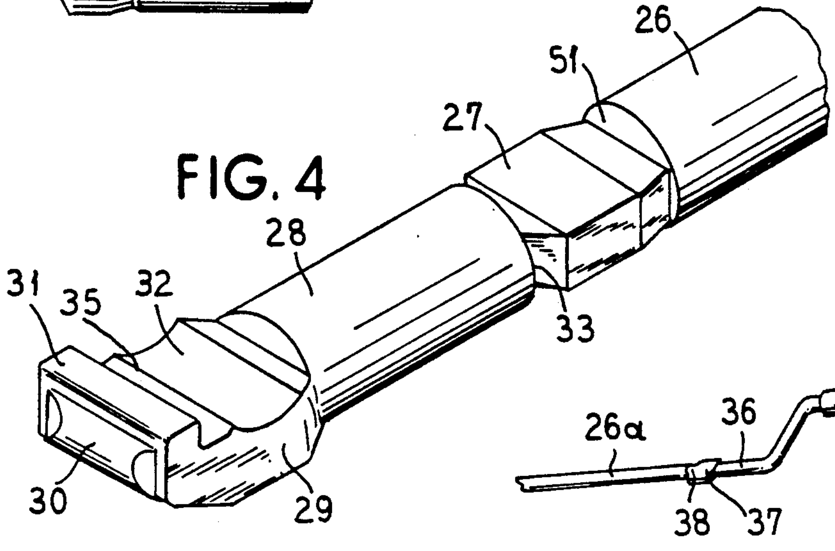
FIG. 4 is an enlarged perspective view of the end of the novel jack handle.

FIG. 1 is a perspective view of a jack 10 such as a bottle jack which has a base 12 and a body portion 13 from which a screw 14 extends. A support or pad 16 is mounted on the top end of the screw 14 for engaging a vehicle such as a truck or van, for example. An extension 17 of the body portion 13 rotatably supports a shaft 18 which is formed with a slot 19 into which the end 32 of a jack handle 1 1 can be inserted so as to raise and lower the jack. The jack handle 1 1 has an end handle 21 connected to a portion 22 that is connected to a crank portion 23 that has a handle 24. The crank 23 is connected to the shaft 26. As best shown in FIGS. 2, 3 and 4, a shoulder 51 is formed on the shaft 26 adjacent the end remote from the handle 21 and a flatted portion 27 is formed. At the end of the flatted portion 27 away from the shoulder 51 is formed a reduced crosssectional portion 33 which is joined by a shaft portion 28 that carries the jack engaging end portion 32. The jack engaging portion 32 comprises a generally flatted portion 29 which has a raised end 31 that has a projection 30. A ridge 35 is formed adjacent a curved portion of the end portion 32 as illustrated.

In use, the end portion 32 is inserted into the slot 19 of the jack as illustrated in FIG. 1 and the shaft 26 is rotated with the handles 21 and 24 so as to turn the shaft 18 and raise the jack screw 14 with the pad 16 against the vehicle. If the vehicle being lifted is too heavy for the jack, excessive torque will be required to rotate the shaft 18 and under conditions of excessive torque, the jack handle 1 1 will twist off at the reduced cross-sectional portion 33 such that the flatted portion 27 will separate from the shaft portion 28.

Figure 5:
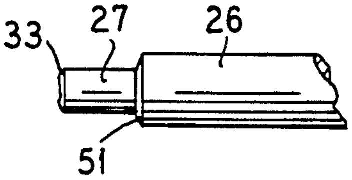
FIG. 5 is a side plan view of the jack handle after twist-off.
Figure 6:
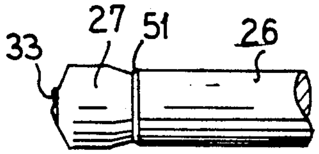
FIG. 6 is a top plan view of the jack handle after twist-off.

When this condition occurs, the portion 32 can be removed from the jack slot 19 and the flatted portion 27 can be inserted into the slot 19 and the jack handle can be rotated to lower the jack by rotating the shaft 18. FIGS. 5 and 6 are, respectively, side and top plan views of the end of the shaft 26 after the portion 28 had twisted off.

Thus, the improved jack handle of the invention prevents overload being applied to the jack since excessive torque will cause the handle to twist off at the reduced cross-sectional portion 33 thus preventing excessive torque being applied to the jack. The jack can then be lowered by inserting the portion 27 into the slot 19 of the jack because the torque for lowering the jack is less than the torque for raising the jack and, thus, the jack can be lowered without subjecting it to excessive torque. Thus, the dangerous condition of trying to remove an extended jack is eliminated.

Figure 7:
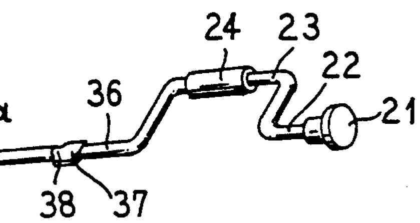
FIG. 7 illustrates a modified form of the invention.

FIG. 7 illustrates a modified form of the jack wherein the crank portion 23 of the handle is connected to a shaft 36 and to a flatted portion 37 which is connected to shaft portion **26*a* by a reduced cross-sectional portion 38. The left end of the shaft 26*a* relative to FIG. 7 carries a jack engaging portion 32, not shown. During overload, the flatted portion 37 separates from the portion 36 at the reduced cross-sectional portion 38 and the portion 26***a* and its jack engaging portion, not shown, can then be removed from the jack slot 19 and the jack can be lowered by inserting the flatted portion 37 into the slot 19 to lower the jack.

Although the preferred embodiment illustrates a jack which is provided with a shaft that has a slot into which the jack handle is inserted, the invention is equally applicable to a square or hexagonal or other shaped jack driving member with which the jack handle can be engaged and wherein the jack handle has a primary engaging portion and a secondary engaging portion usable after the primary engaging portion has been twisted off due to overload.

The jack handle of the invention prevents overload from being applied to a jack by providing a twist-off point and further having a secondary jack engaging portion which can be inserted into the jack so as to lower after twist-off.

Although it has been described with respect to preferred embodiments, it is not to be so limited as changes and modifications can be made therein which are within the full intended scope of the invention as defined by the appended claims.

We claim as our invention:

1. A jack handle for a jack with a drive shaft which prevents excessive torque from being applied to the jack comprising, a jack shaft with one end formed with a primary drive shaft engaging portion for raising and lowering said jack, a handle formed on said jack shaft for rotating it, a torque limiting region formed in said jack shaft between said primary drive shaft engaging portion and said handle frangible upon exceeding a predetermined torque, and a secondary jack shaft engaging portion formed on said jack shaft which can be used to engage said drive shaft to lower said jack after the predetermined torque of said torque limiting region has been exceeded.

2. A jack handle for a jack according to claim 1 wherein said drive shaft of said jack is formed with a slot and said primary drive shaft engaging portion is formed with a first flatted portion that can be inserted into said slot, and said secondary drive shaft engaging portion is formed with a second flatted portion that can be inserted into said slot.

3. A jack handle according to claim 1 wherein said torque limiting region comprises a region of reduced cross-sectional area formed in said jack handle.

4. A jack handle according to claim 3 wherein said primary drive shaft engaging portion is formed on one side of said region of reduced cross-sectional area, and said secondary drive shaft engaging portion is formed the other side of said region of reduced cross-sectional area.

5. A jack handle according to claim 4 wherein said secondary drive shaft engaging portion is formed adjacent said region of reduced cross-sectional area.

* * * * *